Figure 1:
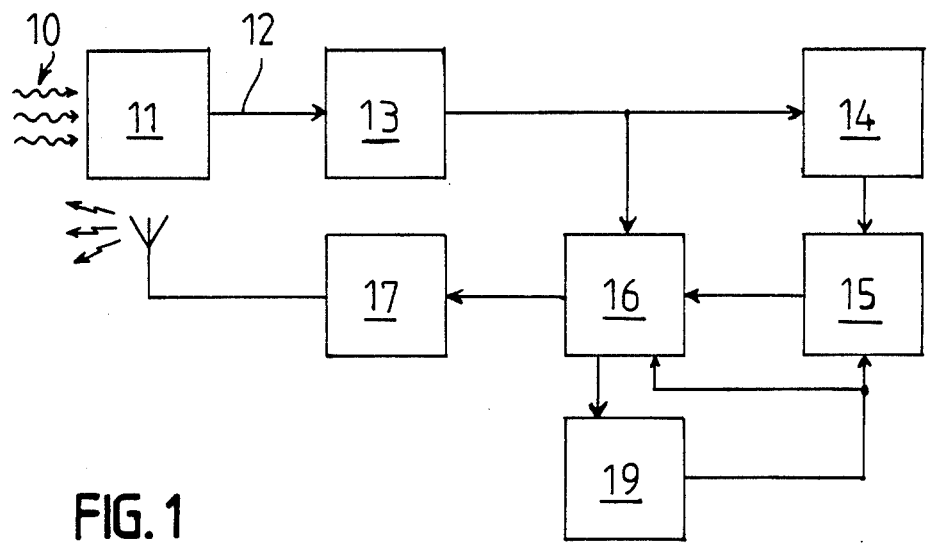

United States Patent [19]

Gamgee et al.

[11] Patent Number: 4,945,225

[45] Date of Patent: Jul. 31, 1990

[54] SIGNAL DISCRIMINATOR

[75] Inventors: Christopher J. Gamgee, Carnegie; Peter Leigh-Jones, Vermont, both of Australia; Charles Jungo, Saratoga, Calif.

[73] Assignee: Amskan Limited, Oakleigh, Australia

[21] Appl. No.: 247,000

[22] Filed: Sep. 16, 1988

[30] Foreign Application Priority Data

Sep. 17, 1987 [AU] Australia .................. PI4408

[51] Int. Cl.$^5$ ............................................. H01J 40/14
[52] U.S. Cl. ................................. 250/214 B; 307/311
[58] Field of Search ................... 250/214 B; 455/604, 455/606, 607, 617; 307/311

[56] References Cited

U.S. PATENT DOCUMENTS

| | | | |
|---|---|---|---|
| 3,328,590 | 6/1967 | Kapsambelis | 250/214 B |
| 4,143,264 | 3/1979 | Gilbert et al. | 250/214 B |
| 4,366,378 | 12/1982 | Simons | 250/214 B |

Primary Examiner—David C. Nelms
Assistant Examiner—Khaled Shami
Attorney, Agent, or Firm—Blakely, Sokoloff, Taylor & Zapman

[57] ABSTRACT

A discriminating apparatus for discriminating a radiant information signal from a background signal, the discriminating apparatus including a radiation sensing means sensitive to an incident signal comprising both an information signal and a background signal and operative to generate an output sensing signal of a level related to the level of the incident signal, and detector means responsive to the sensing signal to detect an information signal component of the sensing signal from a background signal level component of the sensing signal. The discriminating apparatus is characterized in that the detector means comprises a circuit section, particularly a semiconductor element, which is maintained in an operating region where a superimposed information component of the sensing signal resulting from reception by the radiation sensing means of the information signal produces a substantial magnitude detector signal regardless of the level of the background component of the sensing signal resulting from incident background radiation so as to thereby maintain the discrimination of the information signal component of the sensing signal.

8 Claims, 1 Drawing Sheet

SIGNAL DISCRIMINATOR

This invention relates to apparatus for discriminating an information signal from background. The invention relates particularly to the discrimination of an information signal in the form of incident radiation, particularly electromagnetic radiation, but the invention is not limited to this particular field of application.

The apparatus of present invention has been developed for use in relation to electronic apparatus for identification of objects including people and animals e.g. as shown in EP 0108643. Such an identification system includes interrogator means which may comprise for example a directional light source for generating an information or interrogation signal and a radio frequency (RF) receiver for receiving the reply signal generated in response to the interrogation signal. The interrogator means is used with one or more transponders, each of which includes a light receiver or sensor and a circuit for distinguishing light received from the light source of the interrogator means from ambient background light. In response to distinguishing the interrogation signal, the transponder is operative to transmit a coded radio frequency signal back to the RF receiver of the interrogator means to enable identification of the particular transponder and hence the bearer.

A particular need of identification apparatus of this kind is that the transponder include means for discriminating a genuine interrogation signal from spurious signals such as background radiation. It is this particular area of use for which the present invention has been developed. However the invention is applicable also to discrimination of other information signals.

It is an object of the present invention to provide information signal discriminating apparatus which is effective in operation and which is usable in differing environments and particularly for use in discriminating an incident radiant information signal over a range of background radiation levels. This will enable use of the apparatus where the background radiation level varies substantially.

It is a preferred object of the present invention to provide information discriminating apparatus which is particularly suitable for use in electronic object identification systems.

According to the present invention there is provided a discriminating apparatus for discriminating a radiant information signal from a radiant background signal on which the information signal is superimposed, the discriminating apparatus including an incident radiation sensing means sensitive to an incident radiation signal comprising both the radiant information signal and the radiant background signal and operative to generate an output sensing signal of a level related to the intensity of the incident radiation signal, the sensing means having a variable operating point determining the operating characteristics thereof, and detector means responsive to the sensing signal to detect in the sensing signal a radiant information signal component superimposed on a background radiation signal component, the sensing means being operative to generate an output signal of a magnitude related to the incident radiation level up to a saturation level of the output signal, any increases in incident radiation level beyond a radiation level necessary to produce said saturation level do not produce significant changes in magnitude of the output sensing signal, the discriminating apparatus being operative over a range of radiant background signal intensities which can be sufficient to cause the output signal to reach the saturation level without adjustment of the operating point of the sensing means, the discriminating apparatus including a compensating circuit operative in response to any variation in background radiationintensity level within a desired range to adjust the operating point of the incident radiation sensing means so as to maintain the level of the sensing signal below the saturation level.

Figure 2:
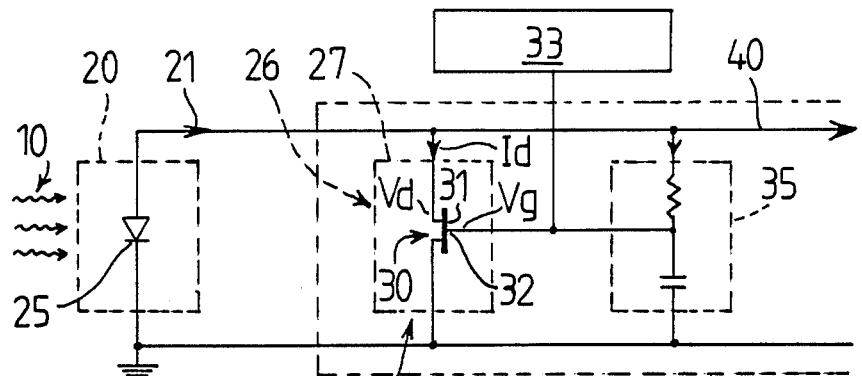
Figure 3:
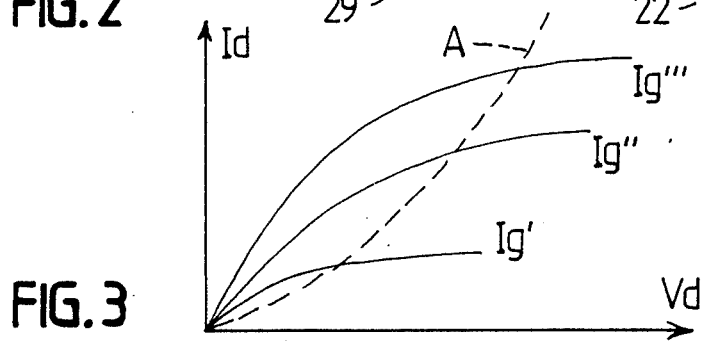

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 shows a schematic block diagram of a transponder for an identification system, FIG. 2 shows an input signal detector according to one possible preferred embodiment of the Present invention and for use in the transponder of FIG. 1, and FIG. 3 is a typical characteristic operating diagram for the FET in FIG. 2.

In FIG. 1, an incident information signal such as an interrogation signal 10 in the form of a short rise time light pulse, e.g. an infrared pulse from a xenon flash lamp, impinges on the input signal detector 11, together with background incident radiation such as sunlight. The detector 11 provides an output signal 12 in response to receiving the incident information signal 10, the output signal 12 being supplied to the threshold comparator 13. The logic startup circuit 14 responds to the threshold comparator 13 to "power up" the circuit including the oscillator 15 and the logic circuit 16. The logic circuit 16 operates to provide data to the transmitter 15 which is shown schematically as a radio frequency transmitter. The logic circuit 16 also controls the power down circuit 19 which at the end of the data transmission shuts down the circuit components that do not need to be further operative.

The detector 11 remains in a quiescent standby condition ready to respond upon receipt of a further incident interrogation signal 10. The entire circuit of FIG. 1 may be provided in the form of a tag carried by a person, animal or article to be identified. It is desirable that the detector 11 draw very low power during its standby condition in order to provide a long useful life of the tag with a small battery incorporated in the tag.

The discriminating apparatus of FIG. 2 acts as the detector 11 of FIG. 1 and includes an incident signal sensing means 20 sensitive to an incident radiant signal 10 comprising both radiant information signal and radiant background signal to generate an output sensing signal 21 of a level related to the level of the incident signal 10. Detector means 22 is responsive to the sensing signal 21 to detect an information signal component of the sensing signal 21 from the background signal level component of the sensing signal 21.

The detector means 22 is responsive to an increase in background signal level component to increase or generally maintain the discrimination of an information signal component of the sensing signal 21 generated upon recePtion by the incident signal sensing means 20 of an information signal superimposed on background signal level. The sensing means 20 is sensitive to incident radiation and generates an output sensing signal 21 of a level related to the intensity of incident radiation 10. The detector means 22 is responsive to the sensing signal 21 to detect in the sensing signal 21 an information signal component superimposed on background radiation component. The sensing means has a variable operating point which determines its operating characteristics. The sensing means 20 generates, in response to incident radiation 10, an output signal 21 of magnitude related to the incident radiation level up to a saturation level of the output signal 21, beyond which saturation level, any changes in incident radiation level do not produce significant changes in magnitude of the output sensing signal 21. The discriminating apparatus includes a compensating circuit 26 operative in response to any variations in background radiation intensity level within a desired range to adjust the operating point of the incident radiation sensing means 20 so as to maintain the level of the sensing signal 21 below the saturation level.

In the case of discriminator apparatus for use in an identification system, the radiant information signal may be a light signal, such as infrared radiation although it will be appreciated that other wavelengths of electromagnetic radiation may be equally applicable. The radiation sensing means 20 is illustrated as a photo diode 25 which operates as a current source, the output current of the photo diode 25 depends on the incident radiation intensity. In this particular embodiment, the compensating circuit 26 comprises a load compensating circuit 27 operative in response to any variations in background radiation intensity level within the desired range to adjust the load on the sensing means 20 (photo diode 25) so that the output sensing signal 21 of the radiation sensing means 20 remains below its saturation level throughout the desired range of background radiation levels.

In particular, the detector means 22 is responsive to an increase in background radiation level to maintain the discrimination of the information component of the sensing signal 21 generated upon reception by the radiation sensing means 20 of the radiant energy information signal superimposed on background radiation level.

In FIG. 2 the detector means 22 and the compensating circuit 26 both include a single common circuit section 29 of variable operating point, the circuit section 29 being located in the load of the radiation sensing means 20, the operating point of the circuit section 29 determining not only the load on the radiation sensing means 20 so that the output signal 21 of the radiation sensing means 20 remains below its saturation level but also determining the sensitivity of the detector means 22.

The circuit section 29 in the preferred embodiment includes a semiconductor element 30 having a current supplied by the radiation sensing means 20, the operating points of the semiconductor element 30 being maintained in the region where a superimposed information component of the signal 21 resulting from reception by the radiation sensing means 20 of the information signal produces a substantial magnitude detector signal 40 regardless of the level of the background component of the sensing signal 21 resulting from incident background radiation.

The semiconductor element 30 comprises an FET 31 arranged so that the sensing signal 21 supplies drain current Id of the FET 31, the gate voltage Vg of the FET 31 being maintained at a level dependent on background radiation level so that a change in drain current Id resulting from the superimposed information signal produces a substantial change in drain voltage Vd. The advantage of this particular preferred arrangement is that only a very low drain current Id needs to be maintained in order to maintain the detector means 22 and compensating circuit 26 in a standby or sensing condition, thereby enabling provision of a discriminator apparatus having a very low quiescent or standby current draw. A very low current drain reference bias 33 may be connected to the gate 32 to maintain the FET 31 at an operating point in which the apparatus remains in its standby condition even in darkness.

Preferably the detector means 22 includes a high pass filter section 35 operative so that relatively high frequency components of the sensing signal 21 can be passed to line 40 for detection or analysing. For example, a short rise time light pulse constituting the information signal superimposed on the background light can appear in the sensing signal 21 as a high frequency signal component superimposed on a generally DC or low frequency fluctuating background signal level.

In summary of the FIG. 2 embodiment there is a detector means 22 which incorporates an FET 31. The FET 31 operates as a compensating circuit 26 to maintain the photo diode current 21 below saturation and also to enable adjustment of the sensitivity of the detector means 22. In particular, as shown in FIG. 3, a desired gate current Ig can be maintained with very little current draw on an associated battery (e.g. with a current draw of less than 1 microamp) such that the operating point of the FET 31 is say generally along the curve marked "A". Maintaining the operating Point of the FET 31 along this curve "A" will enable a small absolute variation in the drain current Id to produce a substantial change in the drain voltage Vd, regardless of whether such a small change in drain current Id represents a small or large proPortion of the absolute magnitude of the drain current Id.

In order to achieve a very low quiescent current draw by the FET 31 in its standby mode, a very low current drain current reference 33 is used to provide a reference bias to the gate 32 of the FET 31.

The detector means in FIG. 2 also includes a filter section 35 for passing a short rise time pulse resulting from an incident interrogation pulse of light. The characteristics of the filter section 35 are chosen so that relatively low frequency variations in the photo detector current 21, e.g. resulting from ambient light condition changes or relatively low rise time radiant energy pulses (sPurious signals), can change the sensitivity of the FET 31 by changing its operating point (via gate voltage Vg) hut do not pass as information components of the sensing signal 21.

It will be appreciated from the foregoing description and accompanying drawings that the present invention provides an information discriminating apparatus that can enable detection of an incident information signal for a wide range of background signal levels. In the case of incident radiation levels being detected and discriminated, the sensing means 20 can be maintained below saturation enabling discrimination over a wide range of background radiation levels. In the preferred embodiment, the discrimination can be carried out with extremely low standby current draw. The discriminating apparatus can also be made very small with many components for example being provided by an IC.

What we claim is:

1. A discriminating apparatus for discriminating a radiant information signal from a radiant background signal on which the information signal is superimposed, the discriminating apparatus including an incident radiation sensing means sensitive to an incident radiation signal comprising both the radiant information signal and the radiant background signal and operative to generate an output sensing signal of a level related to the intensity of the incident radiation signal, the sensing means having a variable operating point determining the operating characteristics thereof, and detector means responsive to the sensing signal to detect in the sensing signal a radiant information signal component superimposed on a background radiation signal component, the detector means operating so as to set the variable operating point of the sensing means, the sensing means being operative to convert the radiant information signal and the radiant background signal to electrical energy so as to thereby generate an output signal of a magnitude related to the incident radiation level which, in the absence of the detector means, is capable of reaching a saturation level of the output signal, any increase in incident radiation level beyond a radiation level necessary to produce said saturation level does not produce significant changes in magnitude of the output sensing signal, the discriminating apparatus being operative over a range of radiant background signal intensities which could be sufficient in the absence of the detector means to cause the output signal to reach the saturation level without adjustment of the operating point of the sensing means, the radiation sensing means comprising a radiation sensitive semiconductor element operative in the photo-voltaic mode so as to produce as the output signal an output current which is dependent on the incident radiation intensity, the discriminating apparatus including a compensating circuit essentially powered by said output signal and operative in response to any variation in background radiation intensity level within a desired range to adjust the operating point of the incident radiation sensing means so as to maintain the level of the sensing signal below the saturation level and thus allow the sensing means and detector means to be responsive to a radiant information signal essentially independent of the level of the radiant background signal.

2. A discriminating apparatus as claimed in claim 1 wherein the radiation sensitive semiconductor element operative in the photo-voltaic mode comprises a photo diode.

3. A discriminating apparatus as claimed in claim 2 characterised in that the compensating circuit comprises a load compensating circuit operative in response to variations in background radiation intensity level within the desired range to adjust the electrical load on the radiation sensitive element so that the output sensing signal of the radiation sensitive means remains below its saturation level throughout the desired range of background radiation levels.

4. A discriminating apparatus as claimed in claim 3 characterised in that the detector means and the compensating circuit both include a single common circuit section of variable operating point, the circuit section being located in the load of the radiation sensing means, the operating point of the circuit section determining not only the load on the radiation sensing means so that the output signal of the radiation sensing means remains below its saturation level but also determining the sensitivity of the detector means.

5. A discriminating apparatus as claimed in claim 4 characterised in that the common circuit section includes a semiconductor element having a current supplied by the radiation sensing means, the operating points of the semiconductor element being maintained in an oPerating region where a superimposed information component of the sensing signal resulting from reception by the radiation sensing means of the information signal produces a substantial magnitude detector signal regardless of the level of the background component of the sensing signal resulting from incident background radiation.

6. A discriminating apparatus as claimed in claim 5 characterised in that the semiconductor element comprises a FET arranged so that the sensing signal supplies drain current of the FET, the gate voltage of the FET being maintained at a level dependent on background radiation level so that a change in drain current resulting from the superimposed information signal produces a substantial change in drain voltage, whereby only a low drain current needs to be maintained in order to maintain the detector means and compensating circuit in a standby or sensing condition, thereby enabling provision of a discriminator apparatus having a very low quiescent or standby current draw.

7. A discriminating apparatus as claimed in claim 6 and further characterised by a very low current drain reference bias connected to the gate of the FET so as to maintain the FET at an operating point in which the discriminating apparatus remains in its standby condition with very low current drain from the reference bias under a very wide range of incident background radiation levels.

8. A discriminating apparatus as claimed in claim 1 characterised in that the detector means includes a high pass filter section operative so that relatively high frequency components of the sensing signal are passed for detection or analysing.

* * * * *

UNITED STATES PATENT AND TRADEMARK OFFICE
CERTIFICATE OF CORRECTION

| | | |
|---|---|---|
| PATENT NO. | : | 4,945,225 |
| DATED | : | 07/31/90 |
| INVENTOR(S) | : | Gamgee et al. |

It is certified that error appears in the above-identified patent and that said Letters Patent is hereby corrected as shown below:

| | | |
|---|---|---|
| col. 04, line 49 | delete "hut" | insert --but-- |
| [56] Attorney, Agent or Firm (Title Page) | delete "Zapman" | insert --Zafman-- |

Signed and Sealed this

Thirtieth Day of November, 1993

Attest:

BRUCE LEHMAN

*Attesting Officer*  *Commissioner of Patents and Trademarks*